(12) United States Patent
Ruthe et al.

(10) Patent No.: US 9,293,157 B1
(45) Date of Patent: Mar. 22, 2016

(54) AUTOMATED ACTIVE FEEDBACK SLICE AND VIEW MILLING OF MAGNETIC HEAD CROSS-SECTIONS

(71) Applicant: Western Digital Technologies, Inc., Irvine, CA (US)

(72) Inventors: Kurt C. Ruthe, Bangkok (TH); Sataporn Sittisak, Pathumtani (TH)

(73) Assignee: Western Digital Technologies, Inc., Irvine, CA (US)

( * ) Notice: Subject to any disclaimer, the term of this patent is extended or adjusted under 35 U.S.C. 154(b) by 263 days.

(21) Appl. No.: 14/088,215

(22) Filed: Nov. 22, 2013

Related U.S. Application Data (62) Division of application No. 13/536,830, filed on Jun. 28, 2012, now abandoned.

(51) Int. Cl.
*G11B 5/127* (2006.01)
*G11B 5/133* (2006.01)
*G11B 5/147* (2006.01)

(52) U.S. Cl.
CPC .............. *G11B 5/127* (2013.01); *G11B 5/1272* (2013.01); *G11B 5/1335* (2013.01); *G11B 5/1475* (2013.01)

(58) Field of Classification Search
CPC .... G11B 5/127; G11B 5/1272; G11B 5/1335; G11B 5/1475
See application file for complete search history.

(56) References Cited

U.S. PATENT DOCUMENTS

| | | | |
|---|---|---|---|
| 6,075,673 A | 6/2000 | Wilde et al. |
| 6,097,575 A | 8/2000 | Trang et al. |
| 6,125,014 A | 9/2000 | Riedlin, Jr. |
| 6,125,015 A | 9/2000 | Carlson et al. |
| 6,130,863 A | 10/2000 | Wang et al. |
| 6,137,656 A | 10/2000 | Levi et al. |
| 6,144,528 A | 11/2000 | Anaya-Dufresne et al. |
| 6,147,838 A | 11/2000 | Chang et al. |
| 6,151,196 A | 11/2000 | Carlson et al. |
| 6,178,064 B1 | 1/2001 | Chang et al. |
| 6,181,522 B1 | 1/2001 | Carlson |
| 6,181,673 B1 | 1/2001 | Wilde et al. |
| 6,229,672 B1 | 5/2001 | Lee et al. |
| 6,236,543 B1 | 5/2001 | Han et al. |
| 6,246,547 B1 | 6/2001 | Bozorgi et al. |
| 6,249,404 B1 | 6/2001 | Doundakov et al. |
| 6,330,131 B1 | 12/2001 | Nepela et al. |
| 6,339,518 B1 | 1/2002 | Chang et al. |
| 6,349,017 B1 | 2/2002 | Schott |
| 6,373,660 B1 | 4/2002 | Lam et al. |
| 6,378,195 B1 | 4/2002 | Carlson |
| 6,522,504 B1 | 2/2003 | Casey |
| 6,538,850 B1 | 3/2003 | Hadian et al. |
| 6,583,953 B1 | 6/2003 | Han et al. |

(Continued)

OTHER PUBLICATIONS

Kurt C. Ruthe, et al., U.S. Appl. No. 13/536,830, filed Jun. 28, 2012, 22 pages.

(Continued)

*Primary Examiner* — Robert Kim
*Assistant Examiner* — Sean Luck (57) ABSTRACT

A dual/beam FIB/SEM system and method for operating such a system are provided. A micrograph of a throat height view of a magnetic writer is obtained through iterative milling and repeated evaluation of the leading bevel angle or pole length. In some cases, the milling depth for a next iteration may be modified based on evaluation of the leading bevel angles of the current iteration.

24 Claims, 7 Drawing Sheets

(56) References Cited

U.S. PATENT DOCUMENTS

| | | | |
|---|---|---|---|
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,628,672 B1 * | 1/2014 | Si .................. G11B 5/1278 216/22 |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2006/0044682 A1 * | 3/2006 | Le .................. G11B 5/1278 360/125.3 |
| 2011/0279926 A1 * | 11/2011 | Si .................. G11B 5/1278 360/122 |
| 2013/0244541 A1 | 9/2013 | Yaemglin et al. |
| 2013/0293982 A1 | 11/2013 | Huber |

OTHER PUBLICATIONS

Office Action dated Aug. 22, 2013 from U.S. Appl. No. 13/536,830, 7 pages.

* cited by examiner

AUTOMATED ACTIVE FEEDBACK SLICE AND VIEW MILLING OF MAGNETIC HEAD CROSS-SECTIONS

REFERENCE TO RELATED APPLICATIONS

This application is a divisional of U.S. patent application Ser. No. 13/536,830, filed Jun. 28, 2012, the content of which is incorporated herein by reference in its entirety.

TECHNICAL FIELD

This invention relates to the field of metrology and more specifically, to subsurface metrology of magnetic write heads.

BACKGROUND

The performance of many devices fabricated using semiconductor methods is critically dependent upon the three-dimensional (3D) structure thereof. For example, the performance of a perpendicular magnetic recording (PMR) write pole is highly dependent upon the sub-surface shape of the write pole under the air bearing surface (ABS). To obtain information about the efficacy of manufacturing methods of these and other devices, it is desirable to perform metrology on micrographs of cross sections of the write pole at various orientations. One such desired cross section micrograph is perpendicular to the leading edge near the center of the pole. This cross section allows metrology on various write pole characteristics, such as the leading edge bevel and throat height.

Typically, cross sections are obtained by milling a device near a desired cut location, and then obtaining a micrograph of the milled surface. For example, dual beam focused ion beam, scanning electron microscope (FIB/SEM) systems are often used for cross sectional metrology. Such systems can perform milling operations, generate micrographs, and deliver cross-sectional metrology information. However, proper cut placement is necessary to obtain suitable metrology information.

The conventional approach to cross-section devices in magnetic recording heads for sub-surface metrology measurements on the devices involves the following steps: First, a low/medium magnification image of the feature of interest—for example, the ABS—for positioning and alignment is obtained. Second, fiducial markers are processed for position referencing. Third, the device is ion beam milled in proximity to the fiducial markers using fixed, pre-defined milling parameters. Finally, imaging and metrology measurements are performed on the final cut face surface.

Often, especially during research and development stages, this inflexible approach provides insufficient efficiency and accuracy. For example, there may be multiple designs per wafer, per section, or per rowbar; devices may have different geometries within a wafer, a section, or a rowbar; and immature process may have intrinsic process variations. These variations often result in widely variable geometries with very tight dimensional windows for the final cut face surface placement which allow accurate metrology in the final image.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiments of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

Figure 1A:
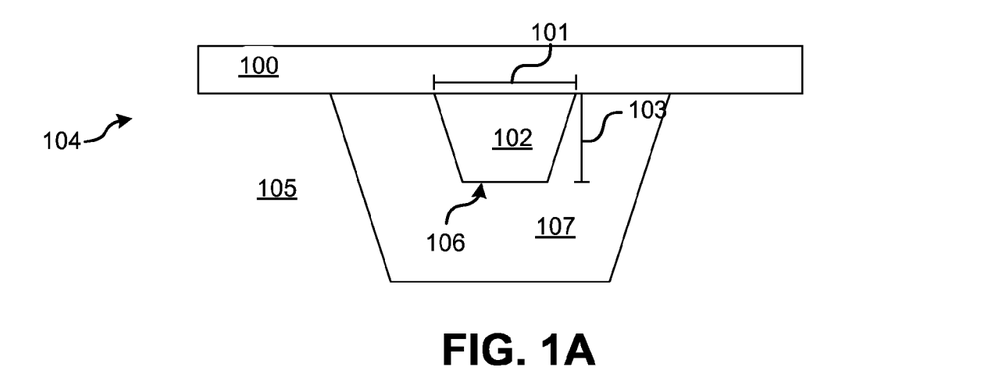
FIG. 1A illustrates a view of a PMR write transducer at the ABS.

FIG. 1A illustrates a view of a PMR writer pole 104 at the ABS. This view is indicative of what might be seen when viewing a SEM of the writer pole taken at the ABS. The writer pole comprises the magnetic writer pole region 102. The pole 102 is surrounded by a non-magnetic leading bevel 107 and a trailing edge 100. The pole is surrounded by a magnetic shielding material 105. The pole 104 has a pole width at the trailing edge 101, representing the width of the magnetic writer pole 102 at the trailing edge of the writer 104. In some cases, the pole 104 has a pole width at the leading edge 106 of the magnetic pole material 102. The pole 104 also has a thickness or length 103 that is the distance between the leading edge and trailing edge of the writer 102.

Figure 1B:
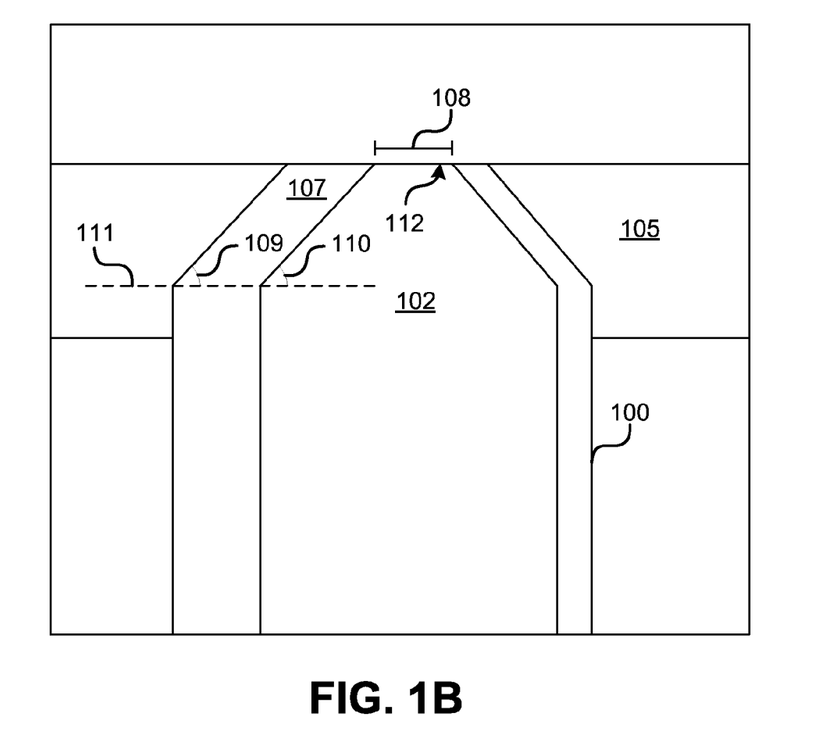
FIG. 1B illustrates a view of a throat height bevel cross section of the PMR write transducer.

FIG. 1B illustrates a throat height view of the PMR writer pole 104. The leading leading bevel angle 109 is the angle of the leading edge of the leading bevel 107. In the illustrated embodiment, the angle 109 is defined with respect to the line 111 perpendicular to the throat height. However, the angle 109 may be defined with respect to other axes and in other manners. The trailing leading bevel angle 110 is the angle of the trailing edge of the leading bevel 107.

Figure 2A:
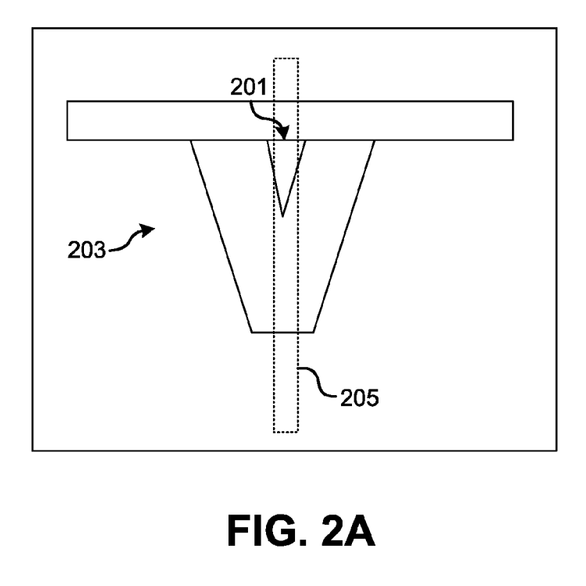
FIGS. 2A and 2B illustrate views different PMR write sensors at the ABS.
Figure 2B:
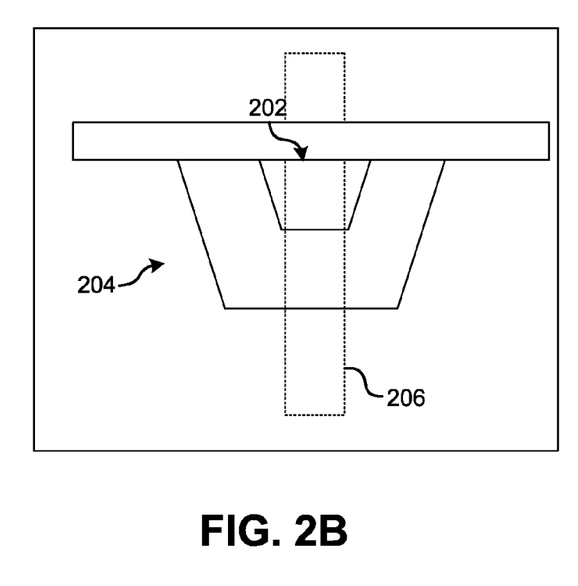

FIG. 2A illustrates an ABS view of a writer 203 that is unsuitable for a conventional blind milling process while FIG. 2B illustrates an ABS view of a writer 204 that is suitable for a conventional blind milling process. The width of the write pole 201 defines a region 205 in which a throat height cross section is desired for metrology. If the write pole has a trapezoidal shape, as with write pole 205, the cross sectional region 206 may be defined as the region within the width of leading edge. If the write pole has a triangular shape, as with write pole 201, the desired region 205 may be within some threshold of the leading apex. For example, the desired region 20 may be between the ⅓, ⅔, or some other length of the two leading edges.

Figure 3:
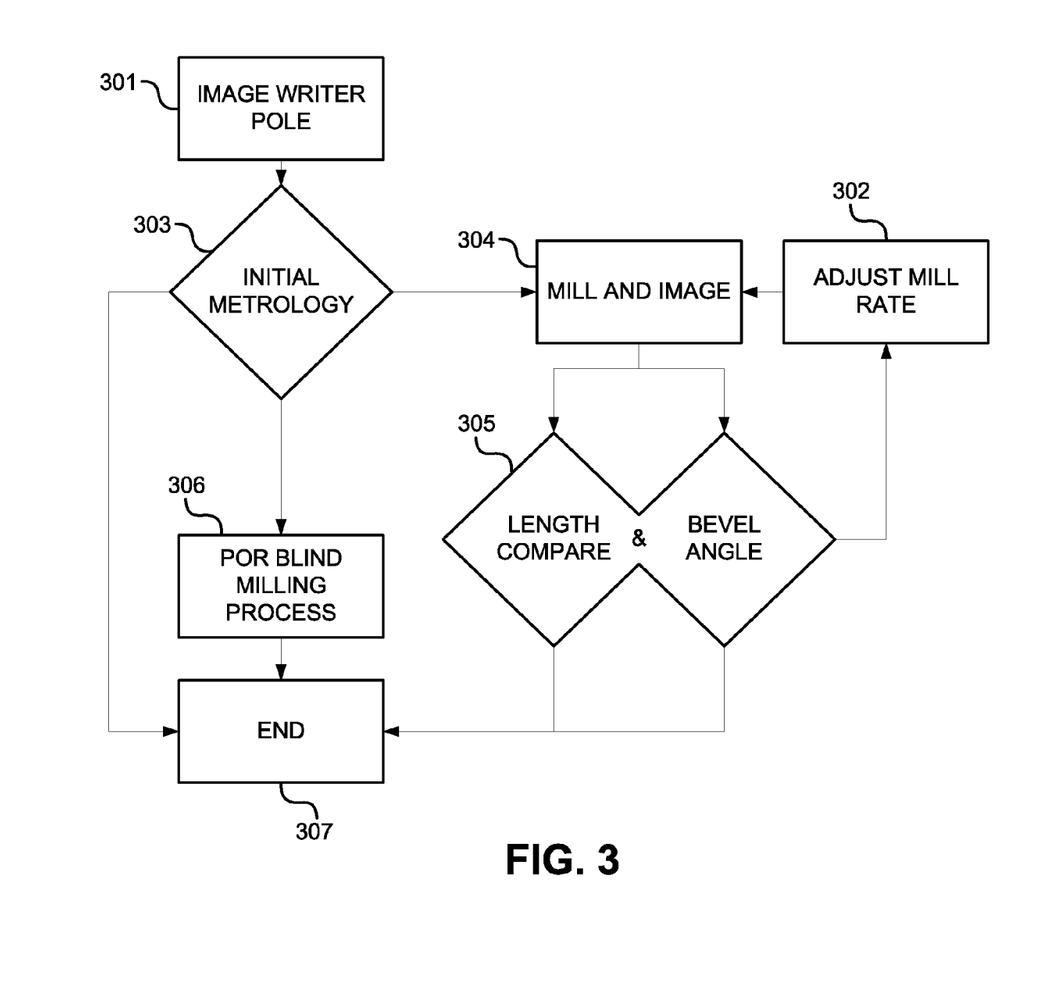
FIG. 3 illustrates a method for automated active feedback slice and view milling of magnetic head cross-sections.

FIG. 3 illustrates a method for obtaining a throat height view micrograph suitable for metrology on a magnetic writer. In step 301, a micrograph, such as a SEM, of the writer at the ABS is obtained. For example, step 301 may comprise using a dual-beam FIB/SEM system to obtain an ABS view of a write pole. The micrograph obtained in step 301 has sufficient resolution to measure the width of the pole at the ABS and to measure the length of the pole at the ABS.

In step 303, some initial metrology is performed on the micrograph obtained in step 301. In the illustrated method, measurements of the width of the pole at the ABS and measurements of the length of the pole at the ABS are performed. For example, the width of the pole at the ABS may be the width of the pole at the trailing edge of the pole. In other cases, the width of the pole at the ABS may be the leading edge width, or a width at a predetermined position along the length of the pole. Based on the results of step 303, the method proceeds to an iterative milling and imaging process 304 or a conventional blind milling process 306. For example, the method may proceed to the conventional blind milling process 306 if the width is greater than 100 nm. In this example, the method may proceed to the iterative process 304 if the width is less than 100 nm. In some cases, a minimum width is required for any metrology on the throat height. In these cases, the method may end without any cross sectioning 307 if a minimum width is not obtained. For example, if the width is less than 55 nm, the method may end 307.

Additionally, metrology and decisions 304 may be performed based on writer height. For example, the height is greater than a threshold, the process may proceed to the conventional blind milling process 306. If the height is less than threshold (and possibly greater than a minimum height threshold) the method proceeds to the iterative process 304. In some cases, both the height and width are measured and must be within threshold ranges for the method to proceed to the conventional blind milling process 306 or the iterative process 304.

In the iterative process 304, a first cross section is made of the writer. The location of the initial milling region is proximal to an outer edge of the pole. The cross section is then imaged to form a micrograph of the milled surface. The method then proceeds to step 305 to perform metrology on the micrograph.

During step 305, the length of the pole is obtained from the micrograph obtained in step 304. The length of the pole measured in step 304 is then compared to the length of the pole obtained in step 303. The measurement from step 304 being approximately equal to the length obtained in step 305 is an indication that the micrograph obtained in step 304 is suitable for further metrology.

Additionally, during step 305, the leading leading bevel angle and the trailing leading bevel angle are measured on the micrograph obtained in step 304. Convergence of the leading leading bevel angle and the trailing leading bevel angle is a second indication that the micrograph obtained in step 304 is suitable for further metrology.

In the illustrated method, if the difference between leading bevel angles are below a bevel angle threshold and if the difference between the pole length obtained at the ABS in step 303 and the pole length at the throat height view obtained in step 304 are below a pole length threshold then the method ends 307 and provides the image obtained in step 304 as the final image for subsequent metrology. If either the difference between bevel angles is greater than the bevel angle threshold or the difference between pole lengths is greater than the pole length threshold, then the method reiterates from step 304. In a specific example, the bevel angle threshold is 4° and the pole length threshold is approximately 0 (i.e., the pole lengths must be approximately equal to proceed to step 307). In other examples, the bevel angle threshold or pole length threshold may be other values. For example, the pole length threshold could be expressed as some percentage, such as 10%, of the nominal initial dimension measured in the ABS micrograph.

In the illustrated method, the mill rate (i.e., the depth of the next milling iteration) is adjusted 302 based on either the current iteration's difference between the leading bevel angles or difference between the pole lengths. For example, the milling rate may be based only on the difference between the leading leading bevel angle and the trailing leading bevel angle. In a particular example, the milling rate is: (a) 3 nm if the difference is greater than 15°; (b) 1 nm if the difference is between 8° and 15°; or (c) 0.5 nm if the difference is between 4° and 8°.

Subsequent iterations proceed as described above with respect to the first iteration. Step 304 is repeated for each iteration, such that the sample is milled (using the depth obtained from step 302) and the milled surface is imaged. The metrology step 305 is repeated and, based on the results, the method ends 307 or another iteration 302, 304 is performed.

In other methods, the method may end 307 if only one of the conditions described with respect to step 305 is met. In further methods, different iterations may evaluate different conditions. For example, in a first iteration, only the pole lengths are evaluated in step 305, and in further iterations only the bevel angles are evaluated. Such a method may be able to better accommodate the triangular writer poles, where convergence of the pole lengths is unlikely.

Figure 4A:
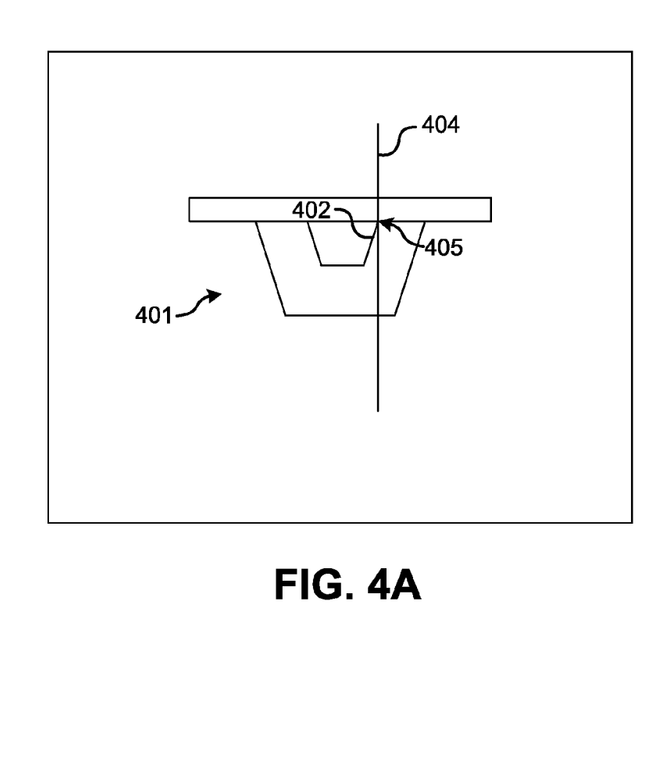
FIG. 4A illustrates a milling location for a first cut in a method for automated active feedback slice and view milling of magnetic head cross-sections.
Figure 4B:
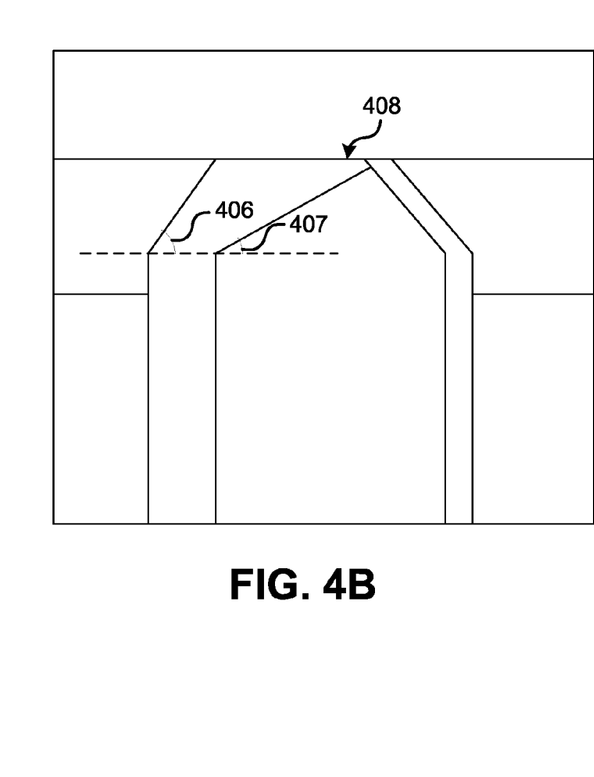
FIG. 4B illustrates a view of a cross section after milling at the milling location illustrated in FIG. 4A.
Figure 5A:
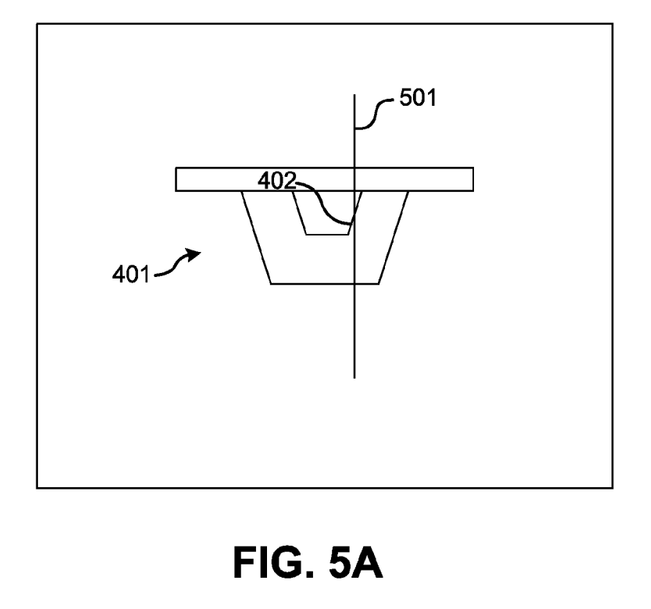
FIG. 5A illustrates a milling location for an iterative cut in a method for automated active feedback slice and view milling of magnetic head cross-sections.
Figure 5B:
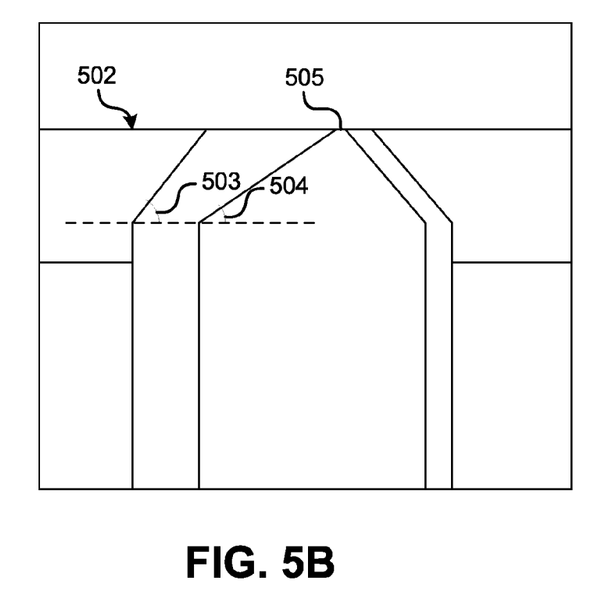
FIG. 5B illustrates a view of a cross section after milling at the milling location illustrated in FIG. 5A.
Figure 6A:
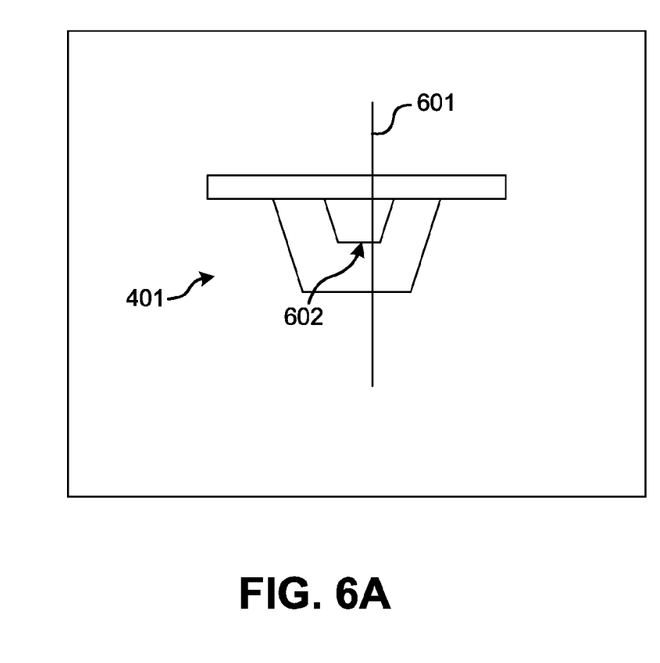
FIG. 6A illustrates a milling location for a final iterative cut in a method for automated active feedback slice and view milling of magnetic head cross-sections.
Figure 6B:
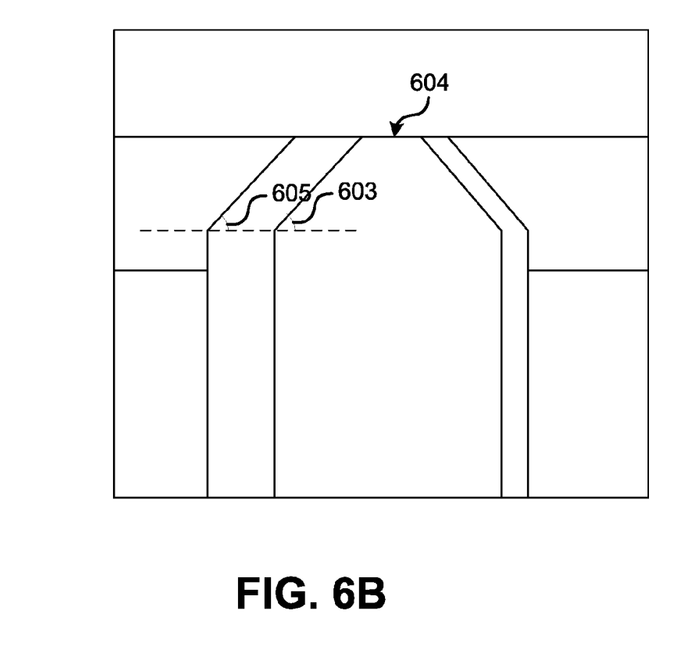
FIG. 6B illustrates a view of a cross section after milling at the milling location illustrated in FIG. 6A.

FIGS. 4-6 illustrate possible milling locations and iterative micrographs as obtained during a series of iterations of a method performed in accordance with FIG. 3.

FIGS. 4A and 4B illustrate an initial milling location and a potential micrograph obtained at the first iteration. FIG. 4A illustrates the milling location 404 on an ABS view 401 of the pole. The first milling location 404 is proximal to the outer edge 402 of the pole. Here, the milling location 404 intersects the outermost corner 405 of the pole. However, in other cases, the initial milling location 404 may be at any location proximal to edge 402. For clarity, the portion of the pole to the right of the milling location 404 is still illustrated, however, one of ordinary skill will understand that this region is removed during milling.

FIG. 4B illustrates a micrograph that might be obtained after milling at location 404. As illustrated, the pole does not impinge the ABS 408 at location 404, so there is no pole length to measure. Additionally, the leading leading bevel angle 406 and trailing leading bevel angle 407 are substantially different from each other. Both of these factors indicate that this micrograph would be unsuitable for subsequent metrology.

FIG. 5A illustrates a second milling location 501 at the ABS view 401. As illustrated, the milling location 501 is closer to the center of the pole than the location 402. FIG. 5B illustrates a possible micrograph that might be obtained at this location. As illustrated, the pole impinges the ABS 502 at this location 501, resulting in a measurable pole length 505. Additionally, the angles 503 and 504 are closer to each other. However, in this micrograph, the length 505 has not converged to the length measurable at the ABS 401 and the angles

503 and 504 are not within the angle threshold. Accordingly, the micrograph in 5B would still not be suitable for subsequent metrology.

FIG. 6A illustrates another iterative milling location 601. For example, in the method of FIG. 3, location 601 may be milled after milling at location 501. In this step, the milling location 601 has reached the leading edge 602 of the pole. A potential resulting micrograph is illustrated in FIG. 6B. In this iteration, the length 604 has converged to the length measurable from the ABS view 401 and the angles 605 and 603 have converged to within the angle threshold. Accordingly, the micrograph of FIG. 6B would be suitable for subsequent writer metrology.

Figure 7:
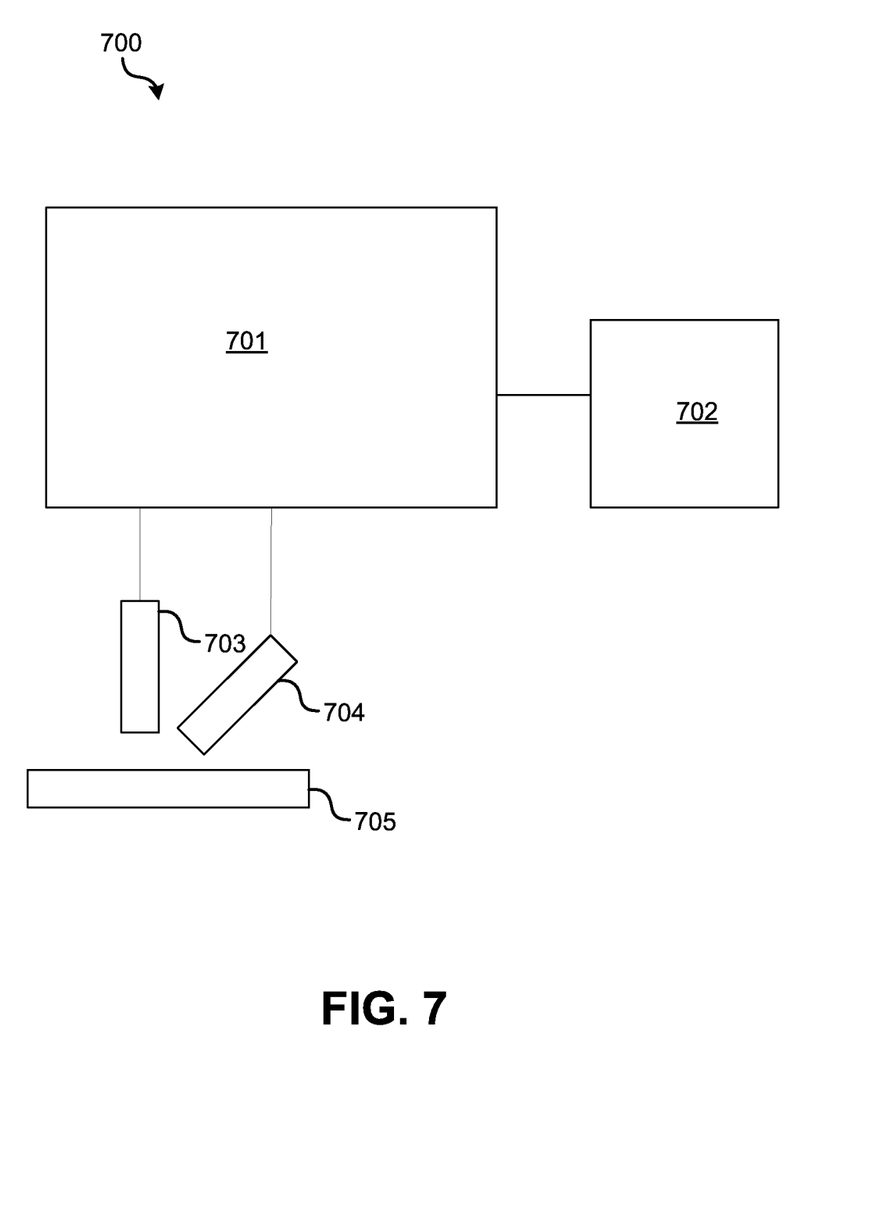
FIG. 7 illustrates an example FIB/SEM metrology system.

FIG. 7 illustrates an example dual-beam FIB/SEM system in which the methods described herein may be implemented. The system 700 includes a controller 701, a workstation 702, a FIB 703 and a SEM 704. The controller 701 operates the FIB 703 to mill the sample 705 at selected locations. The controller 701 further operates the SEM 704 to image the sample 705. For example, the system 700 may be able to obtain images of the sample 705 at the ABS and at the milling planes created by the FIB 703. The controller 701 is further coupled to a workstation 702 that allows a system operator to input control programs and to manually control the operation of the system 700. For example, the controller 701 can comprise non-transitory computer readable medium that can be provided with program code for executing the methods described herein.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method, comprising:
   obtaining a first micrograph of an air bearing surface of a magnetic head pole;
   using the first micrograph, measuring the width of the pole at the air bearing surface and measuring the length of the pole at the air bearing surface;
   if the width of the pole at the air bearing surface is greater than a lower width threshold and less than an upper width threshold, then performing the steps of:
   determining an initial milling region proximal to an outer edge of the pole;
   milling the pole within the initial milling region to form a milled surface; and
   performing at least one iteration, each iteration comprising:
   obtaining an iterative micrograph of the pole at the milled surface;
   using the iterative micrograph, measuring a leading bevel angle and a trailing bevel angle of the pole or measuring the length of the pole at the milled surface; and
   if the difference between the leading bevel angle and the trailing bevel angle is greater than a bevel angle threshold or if the difference between the length of the pole at the milled surface and the length of the pole at the air bearing surface is greater than a pole length threshold, then milling the pole by a milling amount and performing a next iteration, or else providing the iterative micrograph for metrology.

2. The method of claim 1, the first iteration comprising:
   using the iterative micrograph, measuring the length of the pole at the milled surface; and
   if the difference between the length of the pole at the milled surface and the length of the pole at the air bearing surface is greater than a pole length threshold, then milling the pole by a milling amount and performing a next iteration, or else providing the iterative micrograph for metrology.

3. The method of claim 1, each iteration after the first iteration comprising:
   using the iterative micrograph, measuring a leading bevel angle and a trailing bevel angle of the pole; and
   if the difference between the leading bevel angle and the trailing bevel angle is greater than a bevel angle threshold, then milling the pole by a milling amount and performing a next iteration, or else providing the iterative micrograph for metrology.

4. The method of claim 1, wherein the milling amount varies based on the difference between the leading bevel angle and the trailing bevel angle.

5. The method of claim 4, wherein milling amount is:
   3 nm if the difference between the leading bevel angle and the trailing bevel angle is greater than 15°,
   1 nm if the difference between the leading bevel angle and the trailing bevel angle is between 15° and 8°, and
   0.5 nm if the difference between the leading bevel angle and the trailing bevel angle is between 8° and 4°.

6. The method of claim 1, further comprising, if the width of the pole at the air bearing surface is less than the lower width threshold, then providing an indication that the pole is ineligible for milling.

7. The method of claim 1, further comprising, if the width of the pole at the air bearing surface is greater than the upper width threshold, then performing the steps of:
   milling the pole at a location within the width of the pole;
   obtaining a micrograph of the pole at the milled location; and
   providing the micrograph of the pole for metrology.

8. The method of claim 1, wherein the lower width threshold is 55 nm and the upper width threshold is 100 nm.

9. A non-transitory computer readable medium having computer program code stored thereon, the computer program code configured to cause a system to perform the steps of:
   obtaining a first micrograph of an air bearing surface of a magnetic head pole;
   using the first micrograph, measuring the width of the pole at the air bearing surface and measuring the length of the pole at the air bearing surface;
   if the width of the pole at the air bearing surface is greater than a lower width threshold and less than an upper width threshold, then performing the steps of:
   determining an initial milling region proximal to an outer edge of the pole;
   milling the pole within the initial milling region to form a milled surface; and
   performing at least one iteration, each iteration comprising:
   obtaining an iterative micrograph of the pole at the milled surface;
   using the iterative micrograph, measuring a leading bevel angle and a trailing bevel angle of the pole or measuring the length of the pole at the milled surface; and
   if the difference between the leading bevel angle and the trailing bevel angle is greater than a bevel angle threshold or if the difference between the length of the pole at the milled surface and the length of the pole at the air bearing surface is greater than a pole length threshold, then milling the pole by a milling amount and performing a next iteration, or else providing the iterative micrograph for metrology.

10. The non-transitory computer readable medium of claim 9, the first iteration comprising:
   using the iterative micrograph, measuring the length of the pole at the milled surface; and
   if the difference between the length of the pole at the milled surface and the length of the pole at the air bearing surface is greater than a pole length threshold, then milling the pole by a milling amount and performing a next iteration, or else providing the iterative micrograph for metrology.

11. The non-transitory computer readable medium of claim 9, each iteration after the first iteration comprising:
   using the iterative micrograph, measuring a leading bevel angle and a trailing bevel angle of the pole; and
   if the difference between the leading bevel angle and the trailing bevel angle is greater than a bevel angle threshold, then milling the pole by a milling amount and performing a next iteration, or else providing the iterative micrograph for metrology.

12. The non-transitory computer readable medium of claim 9, wherein the milling amount varies based on the difference between the leading bevel angle and the trailing bevel angle.

13. The non-transitory computer readable medium of claim 12, wherein milling amount is:
   3 nm if the difference between the leading bevel angle and the trailing bevel angle is greater than 15°,
   1 nm if the difference between the leading bevel angle and the trailing bevel angle is between 15° and 8°, and
   0.5 nm if the difference between the leading bevel angle and the trailing bevel angle is between 8° and 4°.

14. The non-transitory computer readable medium of claim 9, the steps further comprising, if the width of the pole at the air bearing surface is less than the lower width threshold, then providing an indication that the pole is ineligible for milling.

15. The non-transitory computer readable medium of claim 9, the steps further comprising, if the width of the pole at the air bearing surface is greater than the upper width threshold, then performing the steps of:
   milling the pole at a location within the width of the pole;
   obtaining a micrograph of the pole at the milled location; and
   providing the micrograph of the pole for metrology.

16. The non-transitory computer readable medium of claim 9, wherein the lower width threshold is 55 nm and the upper width threshold is 100 nm.

17. A focused ion beam scanning electron microscope, comprising:
   a focused ion beam milling module;
   a scanning electron microscope module; and
   a control system configured to perform the steps of:
      obtaining a first micrograph of an air bearing surface of a magnetic head pole;
      using the first micrograph, measuring the width of the pole at the air bearing surface and measuring the length of the pole at the air bearing surface;
      if the width of the pole at the air bearing surface is greater than a lower width threshold and less than an upper width threshold, then performing the steps of:
         determining an initial milling region proximal to an outer edge of the pole;
         milling the pole within the initial milling region to form a milled surface; and
         performing at least one iteration, each iteration comprising:
            obtaining an iterative micrograph of the pole at the milled surface;
            using the iterative micrograph, measuring a leading bevel angle and a trailing bevel angle of the pole or measuring the length of the pole at the milled surface; and
            if the difference between the leading bevel angle and the trailing bevel angle is greater than a bevel angle threshold or if the difference between the length of the pole at the milled surface and the length of the pole at the air bearing surface is greater than a pole length threshold, then milling the pole by a milling amount and performing a next iteration, or else providing the iterative micrograph for metrology.

18. The microscope of claim 17, the first iteration comprising:
   using the iterative micrograph, measuring the length of the pole at the milled surface; and
   if the difference between the length of the pole at the milled surface and the length of the pole at the air bearing surface is greater than a pole length threshold, then milling the pole by a milling amount and performing a next iteration, or else providing the iterative micrograph for metrology.

19. The microscope of claim 17, each iteration after the first iteration comprising:
   using the iterative micrograph, measuring a leading bevel angle and a trailing bevel angle of the pole; and
   if the difference between the leading bevel angle and the trailing bevel angle is greater than a bevel angle threshold, then milling the pole by a milling amount and performing a next iteration, or else providing the iterative micrograph for metrology.

20. The microscope of 17, wherein the milling amount varies based on the difference between the leading bevel angle and the trailing bevel angle.

21. The microscope of claim 20, wherein milling amount is:
   3 nm if the difference between the leading bevel angle and the trailing bevel angle is greater than 15°,
   1 nm if the difference between the leading bevel angle and the trailing bevel angle is between 15° and 8°, and
   0.5 nm if the difference between the leading bevel angle and the trailing bevel angle is between 8° and 4°.

22. The microscope of claim 17, the steps further comprising, if the width of the pole at the air bearing surface is less than the lower width threshold, then providing an indication that the pole is ineligible for milling.

23. The microscope of claim 17, the steps further comprising, if the width of the pole at the air bearing surface is greater than the upper width threshold, then performing the steps of:
   milling the pole at a location within the width of the pole;
   obtaining a micrograph of the pole at the milled location; and
   providing the micrograph of the pole for metrology.

24. The microscope of claim 17, wherein the lower width threshold is 55 nm and the upper width threshold is 100 nm.

* * * * *